US006500345B2

(12) United States Patent
Constantine et al.

(10) Patent No.: US 6,500,345 B2
(45) Date of Patent: Dec. 31, 2002

(54) APPARATUS AND METHOD FOR TREATING WATER

(75) Inventors: Christopher P. Constantine, Tenafly, NJ (US); Richard E. Fredricks, Severna Park, MD (US); Gerard J. Lynch, Bridgewater, NJ (US)

(73) Assignee: Maritime Solutions, Inc., Tenafly, NJ (US)

( * ) Notice: Subject to any disclaimer, the term of this patent is extended or adjusted under 35 U.S.C. 154(b) by 0 days.

(21) Appl. No.: 09/885,882

(22) Filed: Jun. 20, 2001

(65) Prior Publication Data

US 2002/0030011 A1 Mar. 14, 2002

Related U.S. Application Data

(63) Continuation-in-part of application No. 09/630,026, filed on Jul. 31, 2000, now abandoned.

(51) Int. Cl.[7] ............................. C02F 1/32; C02F 1/38
(52) U.S. Cl. .................. 210/747; 210/748; 210/764; 210/170; 210/206; 210/258; 210/416.1; 210/512.3
(58) Field of Search ..................... 210/747, 748, 210/749, 754, 756, 764, 787, 799, 170, 198.1, 206, 252, 258, 416.1, 512.1, 512.3

(56) References Cited

U.S. PATENT DOCUMENTS

| | | |
|---|---|---|
| 1,837,191 A | 12/1931 | Baldwin |
| 2,073,520 A | 3/1937 | Saint-Jacques |
| 3,591,011 A | 7/1971 | Holter et al. |
| 4,303,526 A | 12/1981 | Moro et al. |
| 4,305,825 A | 12/1981 | Laval, Jr. |
| 4,478,712 A | 10/1984 | Arnaudeau |
| 4,857,175 A | 8/1989 | Spinnler |
| 4,864,994 A | 9/1989 | Myers |
| 4,980,064 A | 12/1990 | Carroll |
| 5,017,288 A | 5/1991 | Thew et al. |
| 5,084,189 A | 1/1992 | Richter |
| 5,104,520 A | 4/1992 | Maronde et al. |
| 5,104,541 A | 4/1992 | Daniel |
| 5,192,451 A | * 3/1993 | Gill |
| 5,225,082 A | 7/1993 | Young et al. |

(List continued on next page.)

Primary Examiner—David A. Simmons
Assistant Examiner—Fred Prince
(74) Attorney, Agent, or Firm—Notaro & Michalos P.C.

(57) ABSTRACT

An apparatus and method for treating water to be supplied to a ballast tank uses a water pathway having a main inlet for connection to a body of navigable open raw water containing sediment and marine organisms, and a main outlet for connection to the vessel's ballast tank(s). A centrifugal separator is provided in the pathway and has a separator inlet for receiving the raw water. The centrifugal separator separates sediment with some water from the raw water to produce initially processed water which contains at least some marine organisms. The separator has a first outlet for returning the sediment with some water to the body of raw water and a second outlet for supplying the initially processed water to the pathway. A UV or chemical biocidal mechanism is connected to the second outlet and is in the pathway downstream of the centrifugal separator from the main inlet for receiving the initially processed water and for killing and/or altering the DNA of the marine organisms in the initially processed water to produce treated ballast water. A ballast pump is connected in the pathway, in line with the biocidal mechanism for pumping water along the pathway between the main inlet and the main outlet, and through the centrifugal separator and the biocidal mechanism.

27 Claims, 11 Drawing Sheets

U.S. PATENT DOCUMENTS

| | | | |
|---|---|---|---|
| 5,368,748 A | * | 11/1994 | Sanderson |
| 5,466,372 A | | 11/1995 | Jerabek et al. |
| 5,470,465 A | | 11/1995 | Moorehead et al. |
| 5,500,117 A | | 3/1996 | Hamdan |
| 5,510,017 A | | 4/1996 | Abdullayev |
| 5,655,483 A | * | 8/1997 | Lewis et al. |
| 5,667,686 A | | 9/1997 | Schubert |
| 5,858,228 A | | 1/1999 | Turchetti |
| 6,200,486 B1 | * | 3/2001 | Chahine et al. |
| 6,221,260 B1 | * | 4/2001 | Chahine et al. |

* cited by examiner

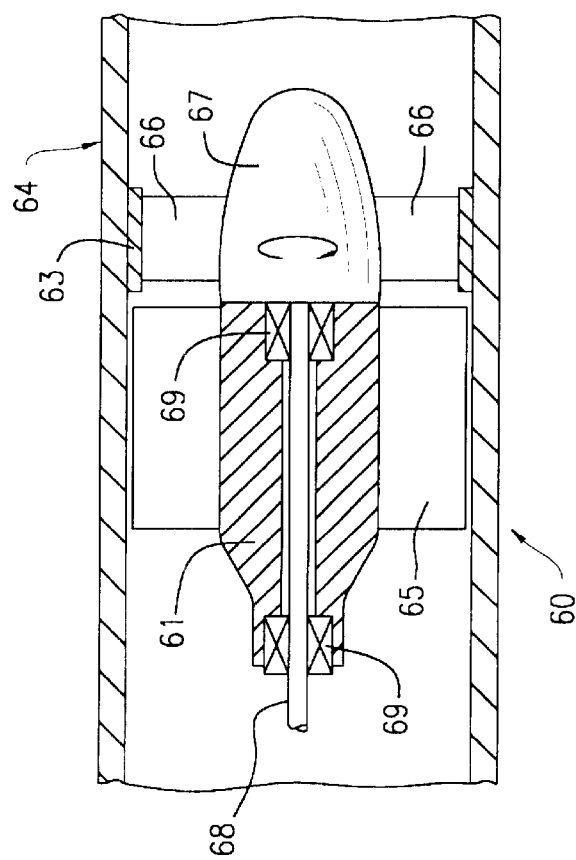
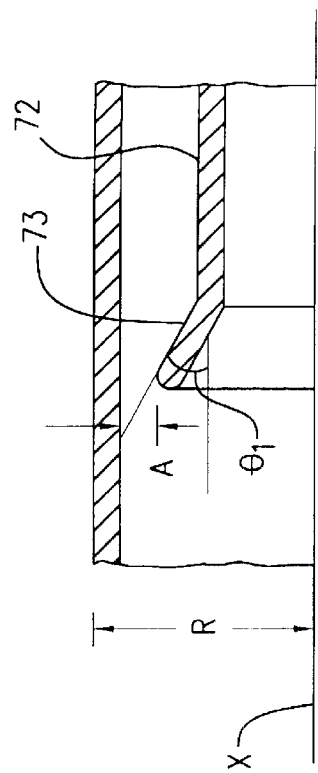
FIG. 8
FIG. 9

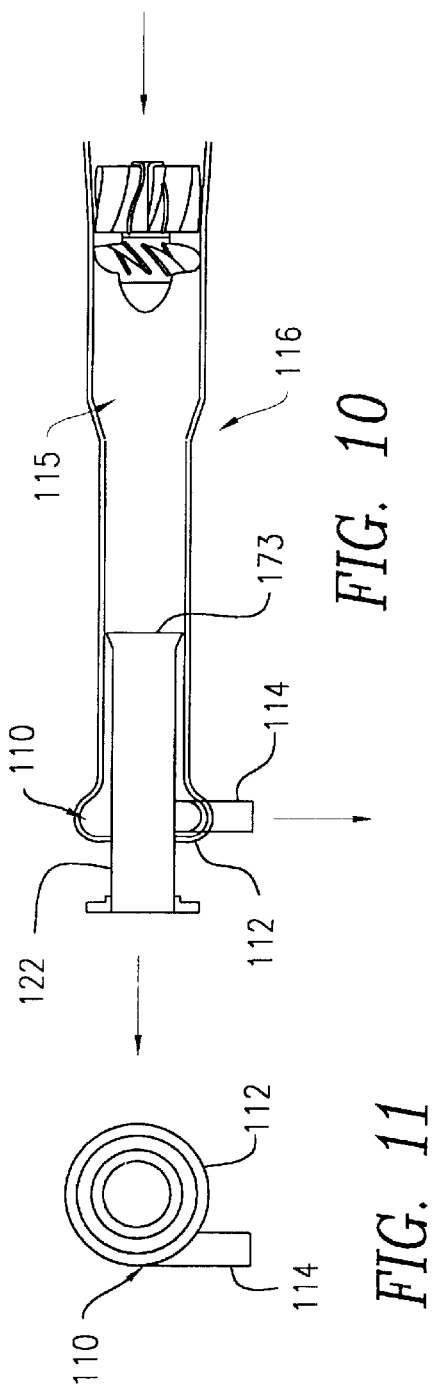
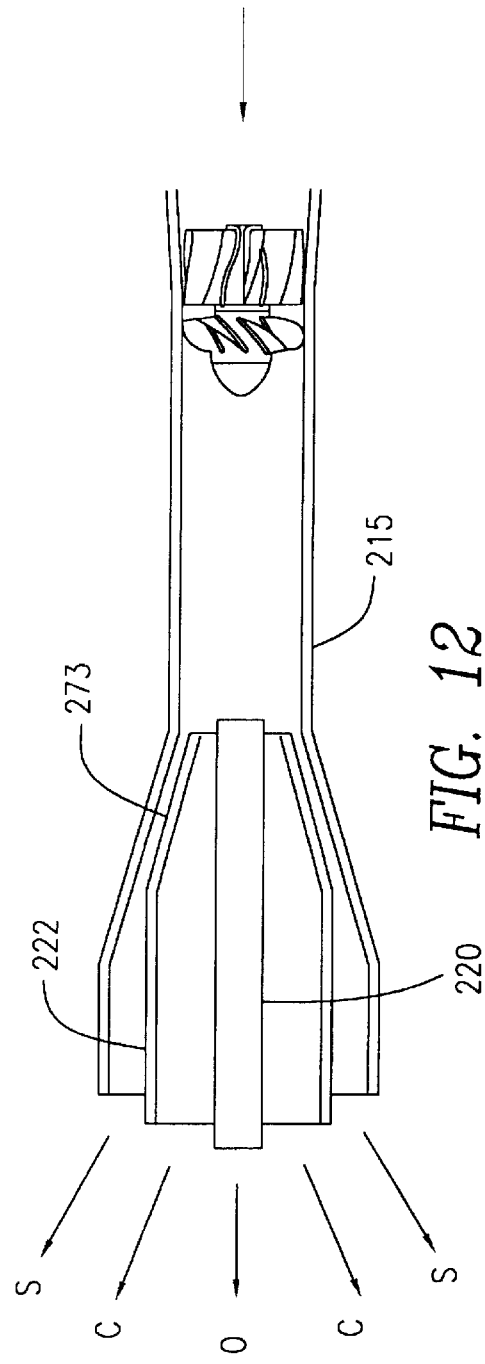

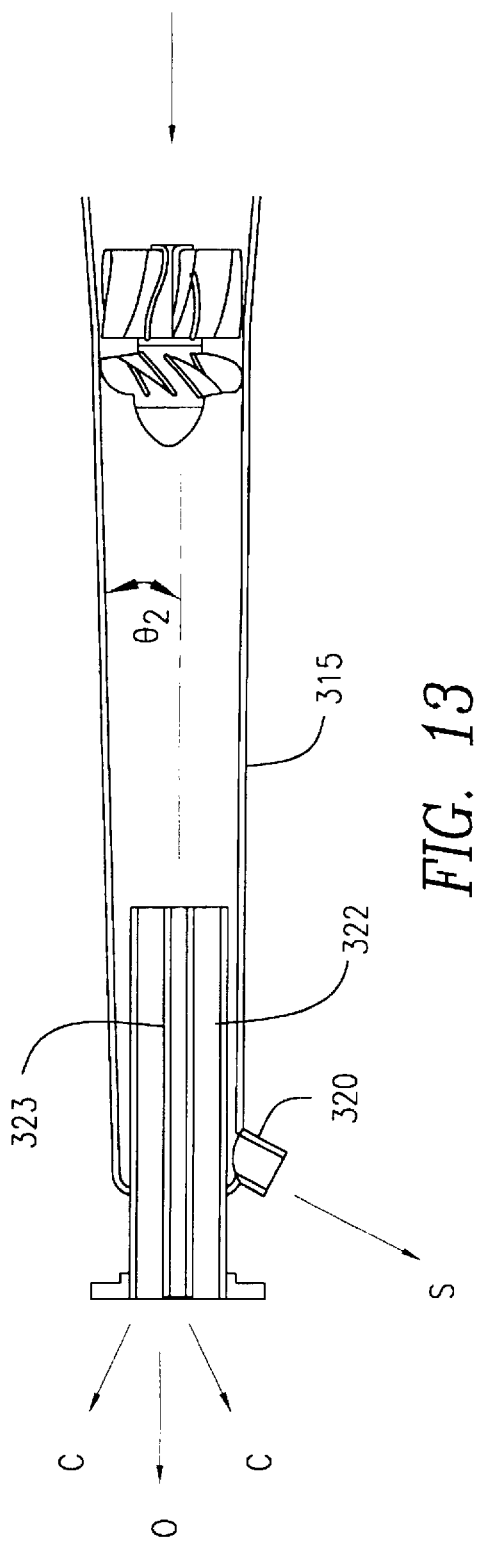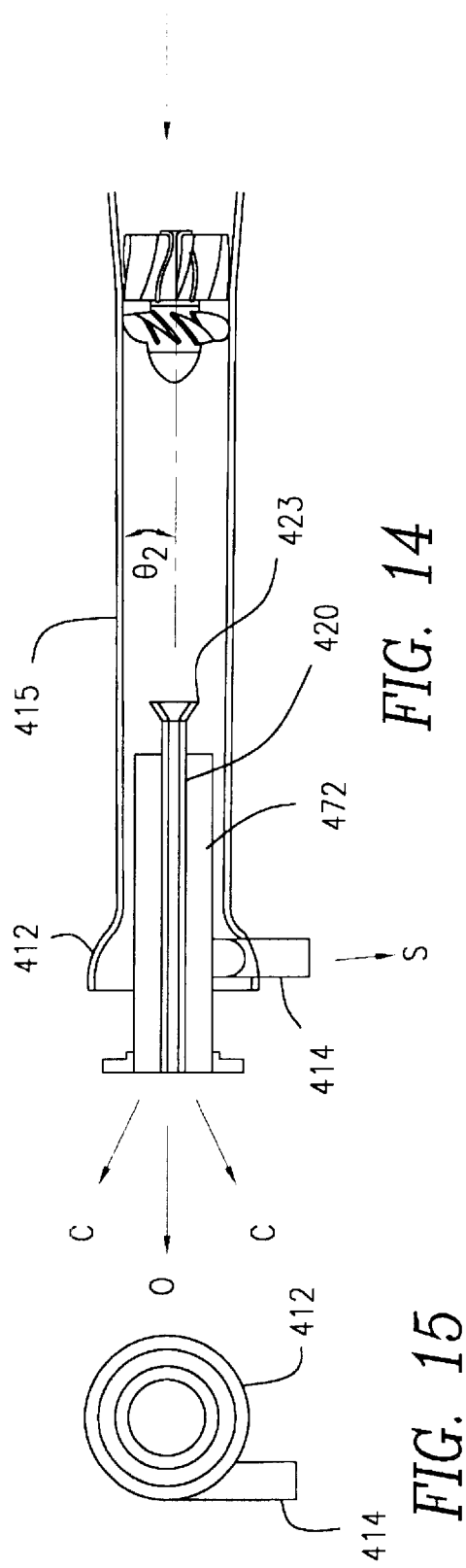

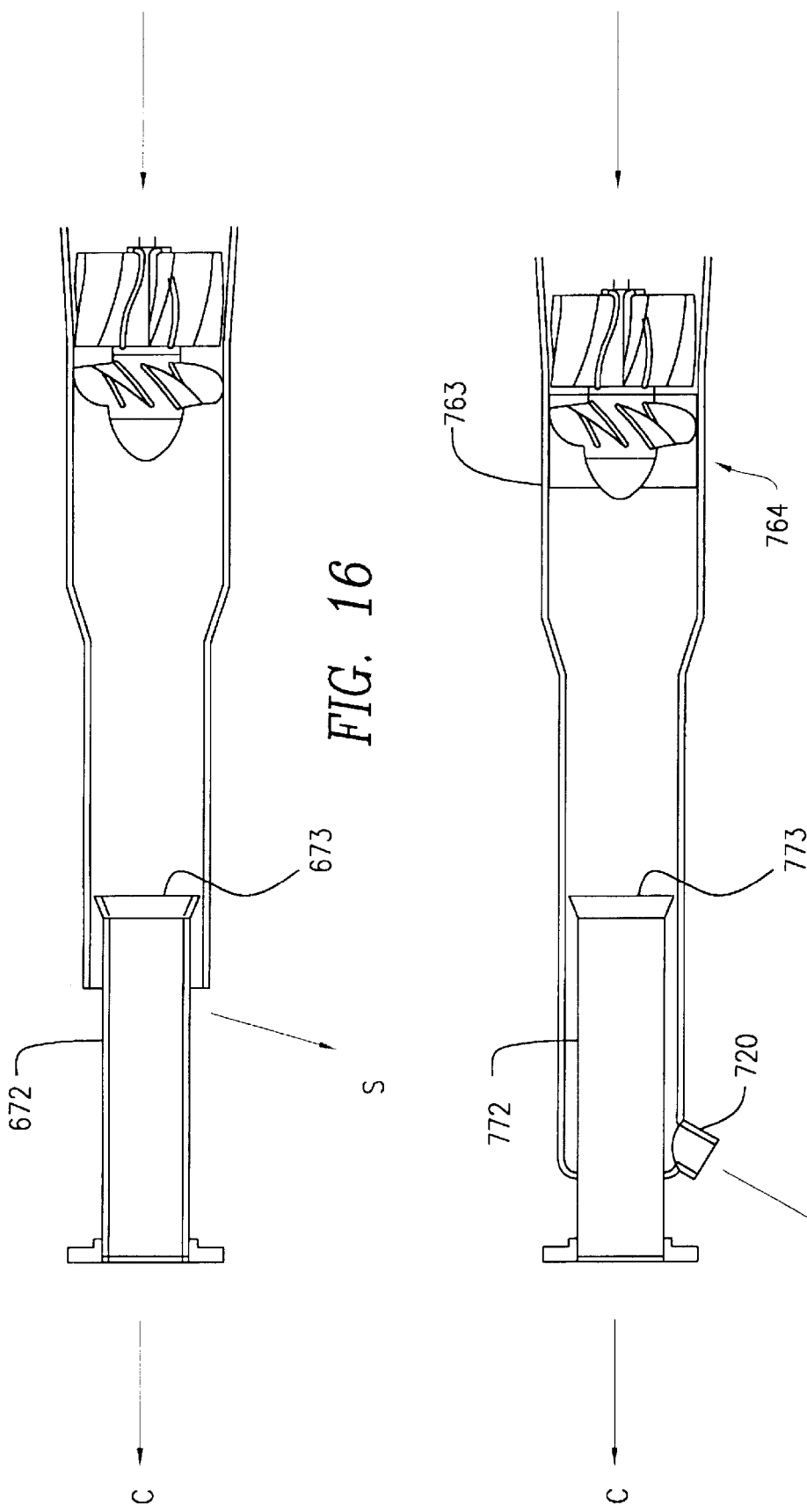

APPARATUS AND METHOD FOR TREATING WATER

CROSS-REFERENCE TO RELATED APPLICATION

This is a continuation-in-part of application Ser. No. 09/630,026 filed Jul. 31, 2000, abandoned.

FIELD AND BACKGROUND OF THE INVENTION

The present invention relates in general to water purification methods and apparatuses, and in particular to a new and useful apparatus and method for treating water by removing sediment and/or treating marine organisms such is, but not limited, to zebra mussels and other marine pests, from ballast water before it is pumped into the ballast of a ship, barge or other sea-going vessel.

Although not native to U.S. or Canadian waters, it is believed that the zebra mussel was transported to North America from Europe in the form of larvae in a ship's ballast water. They now pose a significant threat to marine equipment and ecology.

Zebra mussels have been identified in the lower tidal reaches of the St. Lawrence River as well as in fresh water environments such as the Great Lakes. It has been observed that eventual colonization into estuarine and coastal areas of North America is inevitable. Zebra mussels also can move around. Smaller ones tend to move more than large ones. Also, mussels that have been torn loose during storms seem to have no trouble re-attaching in new places. They secrete proteinaceous adhesive byssal threads from a gland in the foot known as the byssal gland and use this to firmly attach themselves to solid man-made and natural objects.

Efforts are needed to avoid further spread of these and other non-indigenous marine organism. Zebra mussels, for example, kill all the other unionids (native North American bivalves) and their largest immediate adverse effect is mussel biofouling, or the build-up of zebra mussels on any surface. When water fowl eat zebra mussels the result is elevated levels of contaminants in the birds which lead to reproductive problems.

Predation due to waterfowl could control the populations, however, predation would be limited to the warmer months when the Great Lakes are not frozen over, plus the birds would continue to have reproductive problems. Usually in power and water plants, chemical treatments such as chlorine have been used, however, there are environmental problems associated with this since high levels can produce carcinogenic organic side products. High temperature recirculated water also controls these mussels e.g. in a power plant, but this solution is not always workable or environmentally sound.

See the June, 1996 issue of *American Zoologist*, for more through discussion of zebra mussels and the problems they cause.

As presented in the National Academy Press publication, STEMMING THE TIDE, Controlling Introductions of Nonindigenous Species by Ships' Ballast Water, "The overall diversity of biota found in ship's ballast water and the complexity of ballasting patterns and operations mean that predicting the presence of a particular unwanted species in any one vessel is a scientific challenge. Similarly, the great diversity of the larval or juvenile stages of marine invertebrates and fish in ballast water, many of which are not identifiable, means that certifying a vessel as free or safe from all unwanted species is not possible. A further complication is that many of the most prominent introductions of recent years were not recognized as problem species in their donor regions. Ballast water is carried by many types of vessels and is held in a variety of tanks or holds. The relative complexity of ballast operations depends on the size, configuration, and requirements of the ship and on the complexity of its pumping and piping systems. Ballast capacity can range from several cubic meters in sailing boats and fishing boats to hundreds of thousands of cubic meters in large cargo carriers. Large tankers can carry in excess of 200,000 cubic meters of ballast. Ballasting rates can be as high as 15,000 to 20,000 cubic meters per hour."

Current IMO prescribed ballast water management practices, voluntary for the most part now but expected by many to become mandatory in the near future, are largely based upon a process of ballast water exchange. When practiced, ballast water exchange is variously estimated to achieve a level of effectiveness of between 65% and 90% in the exchange of the original ballast water; depending on ship type (tanker, bulk carrier, containership, etc.) and the specific design of a particular vessel. At the same time, no more than 25% of the particulate sediment contained in the ballast water is eliminated. In connection with this, the U.S. Coast Guard and the Smithsonian Environmental Research Center have established a clearinghouse to assess the level of vessel compliance and the value of ballast water exchange practices. However, it is clear that higher level technology needs to be employed to assure shipboard safety, to provide for effective mitigation of biological invasions, and to reduce sediment loading in ballast tanks.

In support of this, and as stated by Kathy Metcalf, Director, Maritime Affairs of the Chamber of Shipping of America, in a submission on the subject to the U.S. Department of Transportation in August 1998, "In both the international and domestic initiatives, ballast water exchange is identified as the only currently viable method of management; however, note is made of the need for development of alternative management methods. Ballast water exchange should not be viewed as the final solution due to the safety issues associated with exchange in the open ocean. We believe that, given proper incentives and flexibility for development, alternative management methods will be identified that will permit treatment of ballast water either onboard or ashore and will prove more effective and far safer than physical exchange methods."

The present invention is an alternative to ballast water exchange. According to the invention, centrifugal separator technology with advanced UV or chemical biocide technology are used in a practical, cost effective solution to this problem.

The ballast water treatment system of the invention utilizes newly designed separator to separate the components of influent water in a primary treatment stage; certain organisms, sediment, and a small quantity of water will then be discharged back into the source water. The "clean" water processed by the new separator is then be treated by UV or chemical biocides in a secondary system stage, where the "residence time" will be significantly reduced because of pre-cleaning in the primary stage, before being transferred via the vessel's ballast pump(s) to the ballast tanks.

Use of UV light and non-oxidizing biocides are the two secondary treatments recommended for further consideration by the Great Lakes Ballast Demonstration Project (Parsons 1997). New high intensity UV lights have recently been developed which promise to increase effectiveness against a broader spectrum of organisms and decrease necessary exposure time, which is critical in the high flow-rate systems needed for ballast water intakes.

Examples of machines that can be used to irradiate the pretreated water with UV are available from a number of international manufacturers and distributors of UV systems.

The use of non-oxidizing biocides is also possible, including several proprietary compounds, at least one of which has a half-life of 12–15 hours. This short half-life is essential because it reduces the potential environmental problem of introducing these compounds into the environment when treated ballast water is discharged. In addition, these compounds are highly effective in very small concentrations (parts per million).

U.S. patents which are material to the separator aspect of the present invention are U.S. Pat. Nos. 1,837,191; 2,073,520; 3,591,011; 4,303,526; 4,305,825; 4,478,712; 4,857,175; 4,864,994; 4,980,064; 5,017,288; 5,084,189; 5,104,520; 5,104,541; 5,225,082; 5,466,372; 5,470,465; 5,500,117; 5,510,017; 5,667,686; and 5,858,228.

SUMMARY OF THE INVENTION

Accordingly, an object of the present invention is to provide an apparatus for treating water to be supplied to a ballast tank and for reducing silt and sediment build-up in the ballast tank, which comprises: means defining a water pathway having a main inlet for connection to a body of navigable open raw water containing sediment and marine organisms, and a main outlet for connection to a vessel's ballast tank(s); centrifugal separator means in the pathway and having a separator means inlet for receiving the raw water, the separator means separating sediment with some water from the raw water to produce initially processed water which contains at least some marine organisms, the separator means having a first outlet for supplying the initially processed water to the pathway, and a second outlet for returning the sediment with some water to the body of raw water; biocide means connected to the first outlet and in the pathway downstream of the separator means from the main inlet, for receiving the initially processed water and for disabling the marine organisms in the initially processed water to produce treated ballast water; and ballast pump means connected to the pathway, in line with the biocide means for pumping water along the pathway between the main inlet and the main outlet, and through the separator means and the biocide means.

A further object is to provide such an apparatus wherein the centrifugal separator means can be used as a general purpose separator and which, for general use and for use in the ballast water treatment system, comprises fluid passage means connected between the separator means inlet for receiving the raw water and the first and second outlets, the separator means having a longitudinal axis; a discharge conduit connected to the second outlet; stator means positioned in the fluid passage means for imparting an initial swirling axial movement to the raw water in the fluid passage means passing the stator means; rotatable solid core rotor means positioned in the fluid passage means downstream of the stator means for imparting a further swirling axial movement to the raw water in the fluid passage means downstream of the rotor means and in the discharge conduit and causing the sediment to migrate outwardly; the stator means comprising a stator hub and a plurality of circumferentially spaced fixed helical blades connected to the stator hub, the rotor means comprising an rotor hub and a plurality of circumferentially spaced rotating helical blades connected to the rotor hub.

A still further object of the invention is to provided such an apparatus wherein the biocide means comprises UV irradiation means for killing and/or altering the DNA of the marine organisms by irradiation or wherein the biocide means comprises chemical means for killing and/or altering the DNA of the marine organisms using a chemical biocidal agent.

Another object of the invention is to provide a method for treating water to be supplied to a ballast tank, comprising: establishing a water pathway having a main inlet for connection to a body of navigable open raw water containing sediment and marine organisms, and a main outlet for connection to a vessel's ballast tank(s); centrifugally separating the raw water for separating sediment with some water from the raw water to produce initially processed water which contains at least some marine organisms, the separating step taking place in the pathway; subjecting the initially processed water to a biocidal action downstream of the centrifugal separating step in the pathway killing and/or altering the DNA of the marine organisms in the initially processed water to produce treated ballast water and pumping water along the pathway using a ballast pump means in line with the biocidal action step.

A further objective of the invention is to provide a method wherein the biocidal step comprises UV irradiation of the marine organisms or exposing the organisms to a chemical biocidal agent.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 8 is an enlarged view of the outlet area of the separator of FIG. 3;

FIG. 9 is an enlarged view of the hub area of the stator and the rotor of the separator of the invention;

FIG. 10 is a longitudinal sectional view of a embodiment of the separator for use with the invention and having a tangential volute discharge;

FIG. 11 is a radial sectional view of the separator of FIG. 10 taken near the outlet end of the device;

FIG. 12 is a longitudinal sectional view of an embodiment of the separator having an axially enlarging conical outlet;

FIG. 13 is a longitudinal sectional view of an embodiment of the separator having a conical separator passage or conduit and other advantageous features of the invention;

FIG. 14 is a longitudinal sectional view of another embodiment of the separator having a conical separator passage or conduit;

FIG. 15 is a radial sectional view of the separator of FIG. 14 taken near the outlet end of the device;

FIG. 16 is a longitudinal sectional view of another embodiment of the separator;

FIG. 17 is a longitudinal sectional view of a still further embodiment of the separator;

DESCRIPTION OF THE PREFERRED EMBODIMENT

Figure 1:
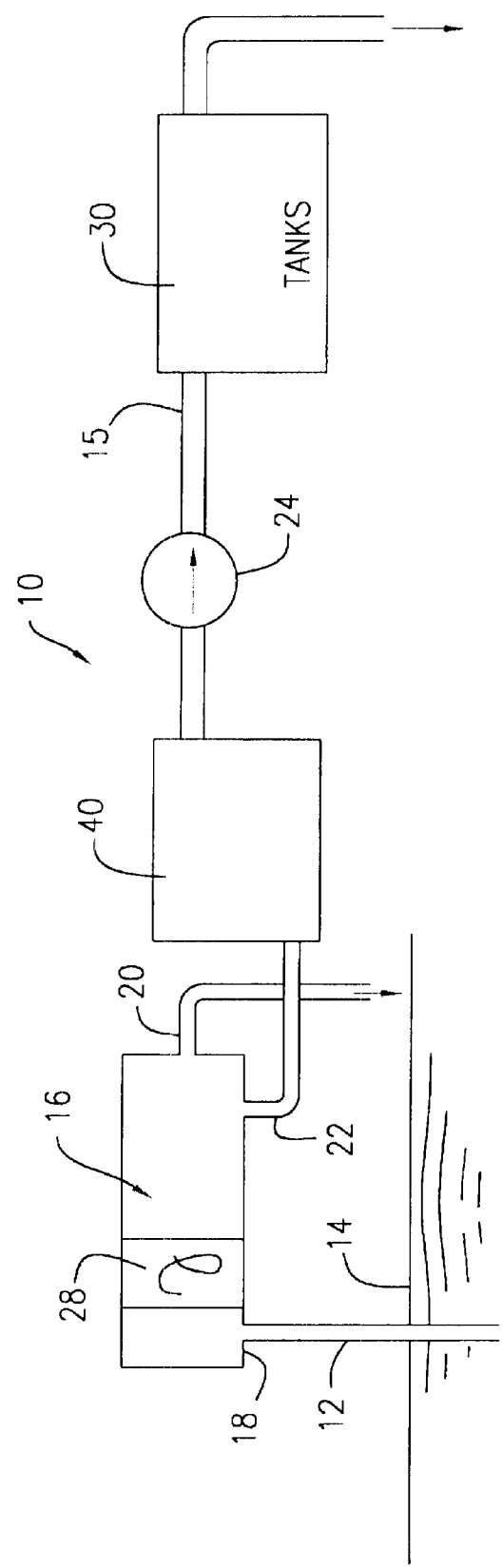
FIG. 1 is a schematic diagram of a first embodiment of the invention.
Figure 2:
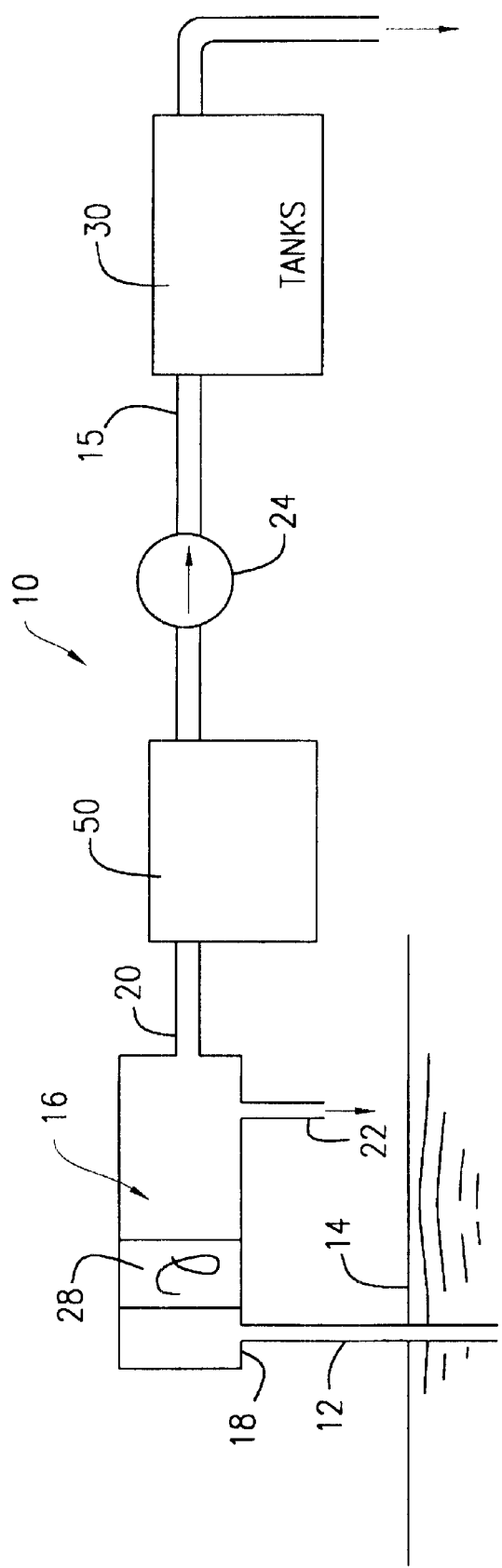
FIG. 2 is a schematic diagram of a second embodiment of the invention.

Referring to the drawings in particular, the invention embodied therein comprises an apparatus 10 for treating water in general, or specifically water to be supplied to a ballast tank 30, which comprises means defining a water pathway having a main inlet 12 for engagement with a body of navigable open raw water 14 containing sediment and marine organisms, and a main outlet 15 for connection to a vessel ballast tank 30. Although a simple rectangular tank is illustrate in FIG. 1, it should be understood that various sizes, shapes, vessel locations and numbers of ballast tanks are use on vessels of various sizes, including but not limited to, tankers, Panamax size oil bulk ore carries, Great Lake bulk vessels, container ship, large pleasure craft, and sea-going and river barges, to name only a few. The invention can also be used to transfer treated water for dredges, power plants and canal locks, which, for the purpose of this disclosure are also considered to be vessels with ballast tanks.

According to the invention, in order to maximize the effect of a subsequent biocidal step, a centrifugal separator 16 is provided in the pathway to remove sediment and thus clarify the water to increase the effect of an irradiation step or a chemical biocidal effect. The separator 16 has a separator means inlet 18 for receiving the raw water. The centrifugal separator separates sediment with some water from the raw water to produce initially processed water which contains at least some marine organisms, the centrifugal separator having a first outlet 22 for supplying the initially processed water back to the pathway, and a second outlet 20 for returning the sediment with some water to the body of raw water.

The preferred embodiment of separator 16 is the new centrifugal separator shown in FIGS. 3 and 7–9 herein.

Biocide means 40 are connected to the first outlet and in the pathway, downstream of the separator from the main inlet 12. Biocide means 40 receives the initially processed water from outlet 22 for killing and/or altering the DNA of the marine organisms in the initially processed water to produce treated water at its outlet in the pathway.

A ballast pump 24, of known design and capacity for the ballast tank 30 is connected in the pathway, in line with the biocide means for pumping water along the pathway between the main inlet 12 and the main outlet 15, and through the centrifugal separator and the biocide means.

Figure 3:
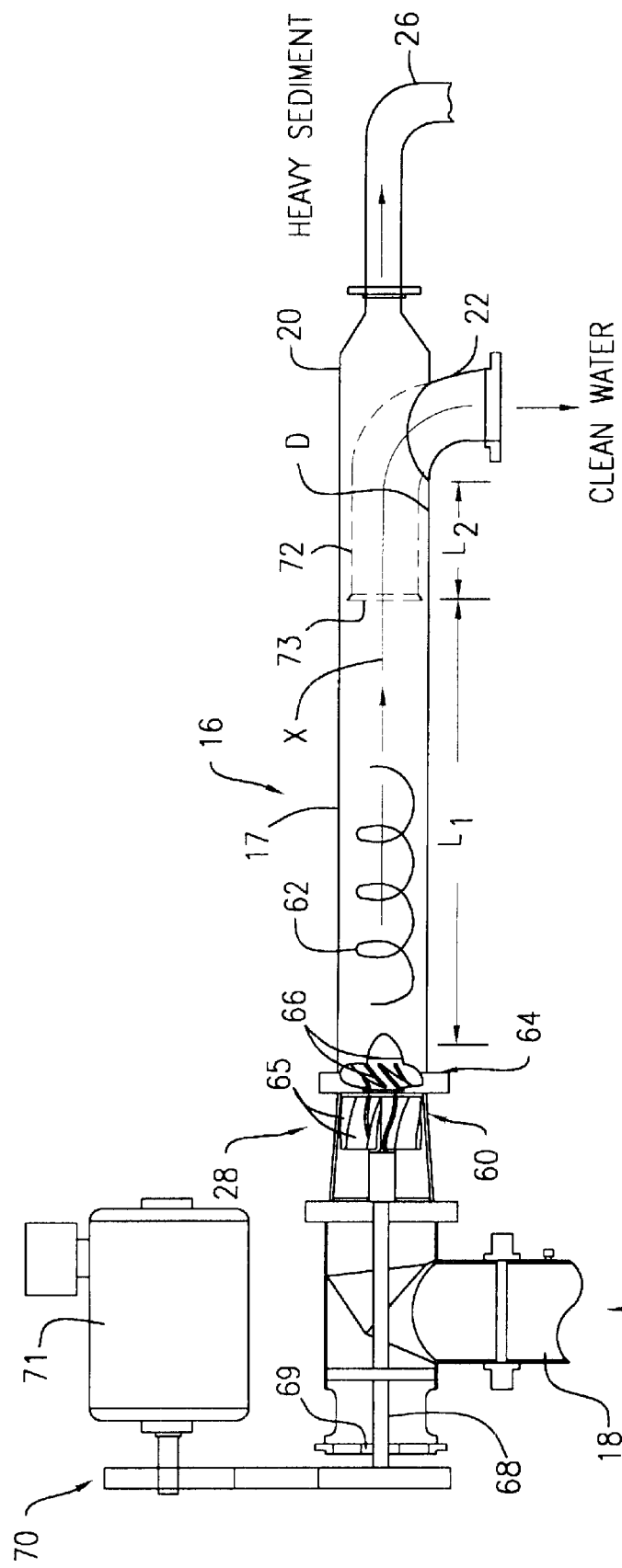
FIG. 3 is a longitudinal sectional view of a centrifugal separator for use with the invention.

The centrifugal separator 16 is shown in greater detail in FIG. 3. It comprises a fluid passage or pipe 17 connected between the separator inlet 18 for receiving the raw water and the first and second outlets 22,20. The separator has a longitudinal axis and a discharge conduit 26 connected to the second outlet 20 and out of the fluid passage from return of heavy sediment to the body of water. Composition swirl means 28 are positioned in the fluid passage for imparting a swirling axial movement 62 to the raw water in the fluid passage, downstream of the swirl means for causing the sediment to migrate outwardly. These swirl means, according to the present invention, comprise a stator 60 and a downstream rotor 64 in the fluid passage of the separator.

The stator 60, also shown in FIG. 9, has a fixed streamlined hub 61 and a plurality of circumferentially spaced helical blades 65 fixed around the hub and extending along the longitudinal axis of the fluid passage to initiate the swirling flow 62 as the water passes the blades.

The rotor 64 also comprises a streamlined hub 67 which is mounted for rotation in the passage, on a shaft 68 mounted on bearings 69 in the stator hub 61 and at the inlet end of the passage. A belt and pulley or gear system 70 with a motor 71 drive the shaft 68 and rotate the hub 67 as shown in FIG. 3.

A plurality of circumferentially spaced helical rotor blades 66 are connected around the rotor hub 67 and extend along the longitudinal axis of the fluid passage to continue and enhance the swirling flow 62 as the water passes the rotor. The rotor may use open-ended blades (FIG. 7) or blades with an outer cylindrical shroud 63 (FIG. 9) which helps order the flow and reduce turbulence.

The pitch, size and number of helical blades 65 and 66, the fluid passage or separation chamber length, as well as the rotational speed, inside diameter and flow through the swirl means are all selected for removing solids from navigable water at the flow rates needed for ballast water, e.g., about 10 to 20,000 cubic meter/hours.

A central clean water discharge pipe 72 with a flared inlet opening 73 is place at a distance L1, downstream from the swirl means 28. As shown in FIG. 8, an annular passage around flared inlet 73 has a radial width A and is sized for receiving sediment laden water, the sediment, biological particles and other solid migrating to the walls of the passage due to centrifugal forces due to the swirling 62 if the raw water. Annular gap A is proportional to the radius R of the separator passage to maximize solids in the water passing through the gap A. Initially purified water which is free of solids enters inlet 73 which is referred to here as the first clean water inlet 73, as leave the separator through outlet 22.

The length L1 is selected to be long enough to establish a fully developed, smooth and stable swirl 62, and to give the solids time to move out from the passage axis X, to the inner surface of the outer passage wall.

The length L2 of the discharge pipe 72 from the first clean water inlet 73 to a dead spot D where the outlet pipe 22 bends away from the axis X and leaves the passage, is selected to be long enough so that the first clean water inlet 73 is upstream of a back pressure turbulence caused by the dead spot. The presence of this turbulence due to the dead spot D has been shown by computer models of the operation of the separator, and the selection of length L2 for the discharge pipe; has been found to be a useful solution. The turbulence causes particles that had been separated to re-mix with the initially purified water before the heavy sediment has had a chance to pass annular gap A.

Figure 7:
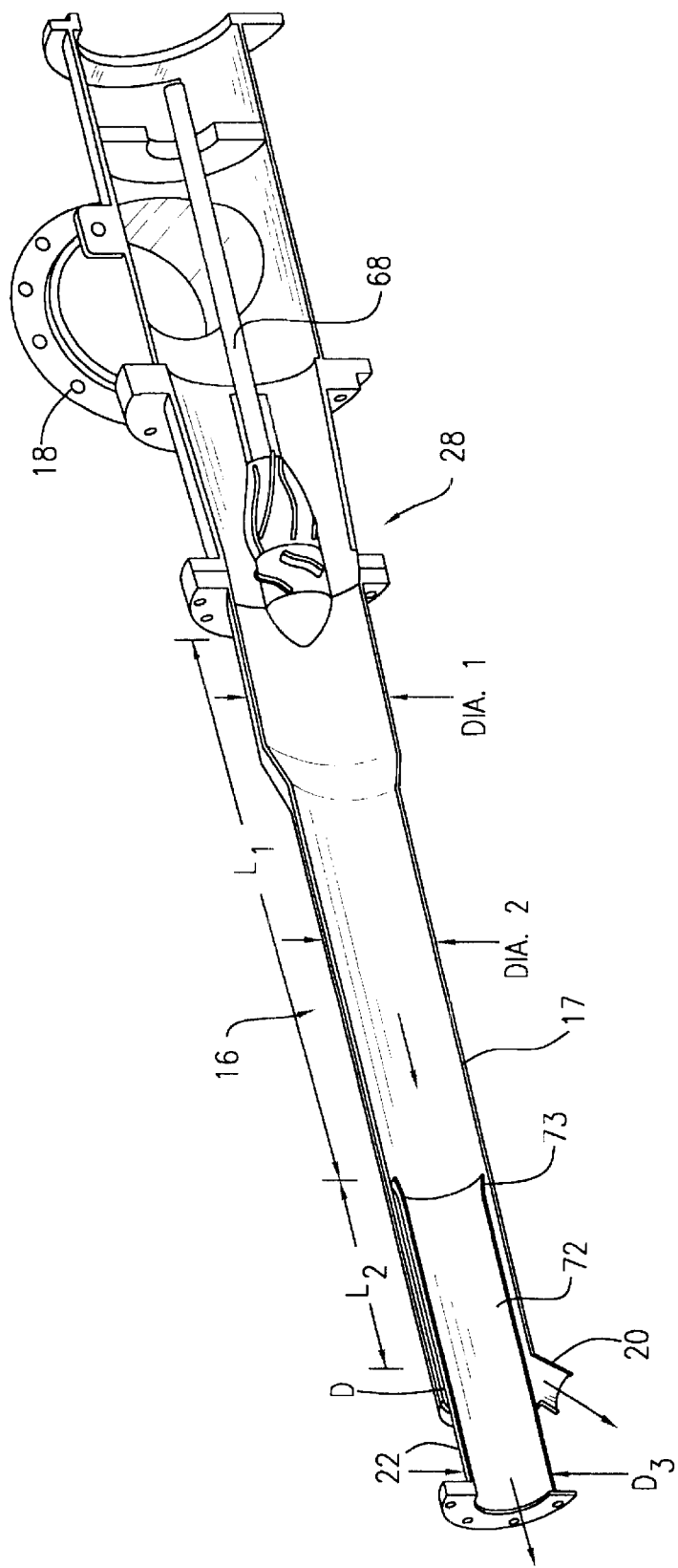
FIG. 7 is a perspective view with portioned cut-away, of the separator of the present invention.

As shown in FIG. 3, two 45 degree turns are used to channel the seawater into inlet 18, from the vertical to the axis X of the separator. In FIG. 7 the inlet is a 90 degree inlet.

Later in this disclosure examples and preferred values for the various physical and operational parameters for the separator of the invention will be given.

The remaining sections of the ballast water treatment system will first be discussed.

Figure 4:
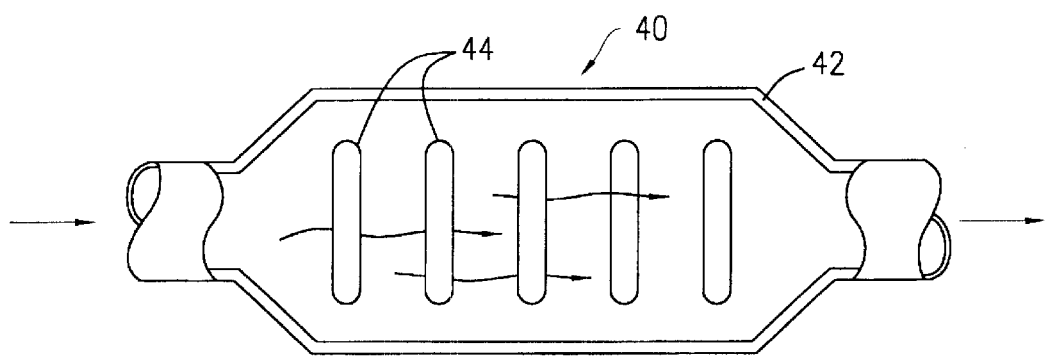
FIG. 4 is a schematic sectional view of a UV biocidal mechanism for use with the first embodiment of the invention, as seen from the top.
Figure 5:
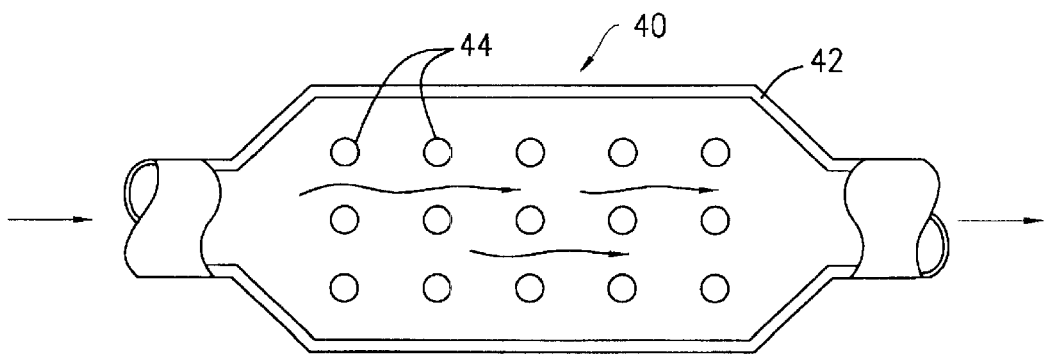
FIG. 5 is a schematic sectional view of the UV biocidal mechanism of FIG. 4 as seen from the side.

A first embodiment of the biocide means 40 is illustrated in FIGS. 4 and 5 and comprise UV irradiation means for killing and/or altering the DNA of the marine organisms by irradiation. For these means to work effectively at the high flow rates required, it is essential that the turbidity of the raw water be reduced by the initial separation process. The UV means 40 comprises an enlarged tank 42 with inlet and outlet for the processed water from separator 16, and an array of UV light tubes 44, extending in rows and columns in tank 42 for irradiating the passing water with sufficient energy to kill and/or alter the DNA of the marine organisms that have not already been separated out and returned to the body of raw water by separator 16.

Figure 6:
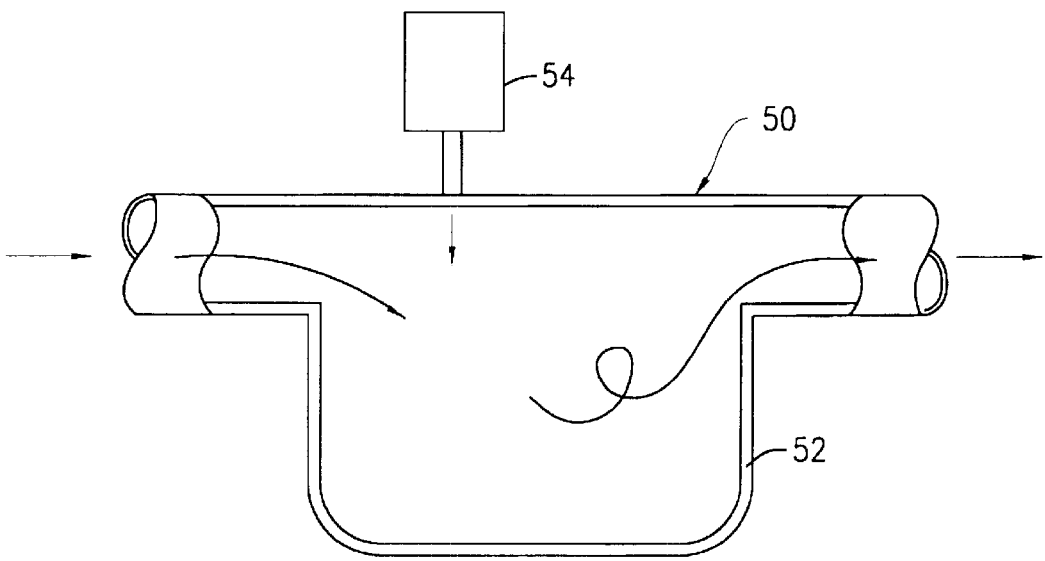
FIG. 6 is a schematic sectional view of a chemical biocidal mechanism for use with the second embodiment of the invention.

In FIG. 6 the biocide means 50 comprises chemical means for killing and/or altering the DNA of the marine organisms using a chemical biocidal agent according to a second embodiment of the invention. The chemical is injected by a metering device 54 into the water.

Preferred Separator Structures and Parameters

The centrifugal separator was designed so as to increase its "heavy" solids collection capability, particularly the solids collection portion with engineered refinement. The inventors anticipate a 98%+extraction of silt and sediment yielding "clean" ballast water for the second stage UV or biocide treatment.

With reference to FIGS. 3, 7 and 8, the following table contains examples and ranges for the various structural parameters of the separator:

The present invention in general, and the separator specifically, is envisioned for various pipeline sizes. Representative dimension ranges are given in the following table. The preferred dimensions assume a separator pipe diameter Dia 1 of 10 inch.

| Parameter | Preferred Range (inches or degrees) | Preferred Dimension (inches or degrees) |
| --- | --- | --- |
| L1 (open passage) | 10"–120" | 60" |
| L2 (discharge pipe) | 6"–48" | 24" |
| Dia1 (17 - diameter) | 1"–36" | 10" |
| Dia2 (28 - diameter) | 0.75"–32" | 8" |
| Dia3 (20 - diameter) | 0.75"–32" | 6" |
| R (annular gap) | 0.125"–2.5" | 1" |
| θ1 (flare angle) | 10°–45° | 22° |
| θ2 (FIGS. 13, 14, 19) | 5°–20° | 10° |

FIGS. 10–21 illustrate other embodiments and features of the separator. Before describing these in detail, however, the following general considerations for design of the separator are disclosed:

The separator is a continuous centrifugation apparatus which uses a shaft mounted, axially positioned, multiple blade rotor assembly, with rotational speeds of 1000–10,000 RPM to cause centrifugal separation of, suspended solids in the range of 0.5–1776 micron from a feed inlet liquid such as a body of water.

It uses a shaft mounted, axially positioned, multiple blade rotor assembly, with rotational speeds of 1000–10,000 RPM to cause centrifugal separation of, lighter specific gravity fluid from a heavier feed inlet liquid.

The multi-blade rotor 64 is of a design that enables exiting liquid to produce a mixed flow configuration creating both axial and radial flow path, blade swirl angles being between 5° and 45°.

The multi-blade rotor may either be an open blade rotor or a shrouded blade rotor (e.g. FIGS. 9 and 17).

The stator plus rotor effect separation "G" gravitational forces that are optimized and cavitation is minimized.

A positive head is produced across the device (inlet to outlet) and the degree of centrifugation is controllable by varying the rotor speed or by varying the rotor pitch angle.

A The axial stator blade arrangement is upstream of the rotor to create a pre-swirl of the incoming liquid therefore enhancing the centrifugal separation of suspended solids from liquid.

The rotor and stator hub contour design effectively reduce viscous drag forces and improve efficiency during the development of separate high and low velocity discharge regions. The high velocity region being where higher "G" forces take place and the separation of higher specific gravity material (liquid and solids) from the lighter specific gravity inlet liquid.

Figure 19:
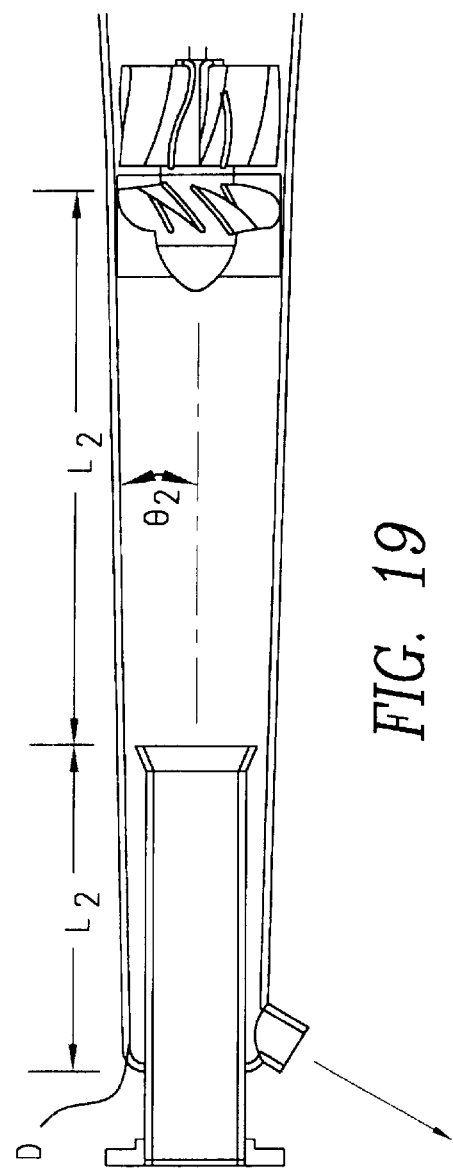
FIG. 19 is a longitudinal sectional view of further embodiment of the separator.

Dirty effluent liquid enters a tubular or conical chamber around inlet 73. The chamber has multiple adjustable or fixed discharge ports including several solid discharge arrangements such as:

solids discharge through an annular diffuser (FIG. 20);
solids discharge through a tangential volute (FIG. 10);
solids discharge through an impingement orifice (FIG. 16);
solids discharge through a conical axial opening (FIG. 12); or
solids discharge through a 45° opening (FIG. 19).

The continuous centrifugation apparatus of the invention cleans effluent liquid that enters a tubular or conical chamber. The chamber has multiple adjustable or fixed discharge ports including several clean fluid discharge arrangements such as:

clean fluid discharge through an annular diffuser (FIG. 13); or
clean fluid discharge through a conical axial opening (FIG. 12).

The light effluent liquid enters a tubular or conical chamber. The chamber has multiple adjustable or fixed discharge ports including several clean fluid discharge arrangements such as:

light specific gravity fluid discharge (e.g. lighter-than-water oils) through a central diffuser (FIGS. 12–14).

FIGS. 10 and 11 illustrate an embodiment of the separator 116 having a tangential volute sediment rich discharge assembly 110 formed by an annular toroidal enlargement 112 of the separator passage pipe or conduit 115. A tangential discharge pipe or outlet 114 extends from enlargement 112. Substantially sediment or particle-free water is discharged axially through the clean-water outlet 122.

An inlet 173 of discharge 122 is flared or conical and the diameter of conduit 115 is stepped down as in the embodiment of FIG. 7. The stepping down of the separator conduit increases the speed of the water downstream of the step, in the x or axial direction, in the y or radial direction and in the z or circumferential direction, to increase the separation effect.

FIG. 12 illustrated another embodiment of the separator which has an axially enlarging conical outlet for clean and "dirty" water 215 and 273 respectively. This embodiment also has a central discharge 220 for a light-fluid containing water fraction which, for example, has a high concentration of oils that are generally lighter than water and are also generally present as contaminants in bodies of navigable water. The separator of the invention can thus separate "clean" water C through its first discharge 222, heavy substance (e.g. solids or sediment) contaminated or "dirty" water S through a second discharge 273, oil or light fluid containing water O through a third discharge 220.

FIG. 13 illustrated an embodiment of the separator having a conical separator passage or conduit 315 which decreases in diameter toward the respective first 322, second 320 and third 323 outlets for the respective clean (C), heavy (S) and light (O) water discharges. The conical shape, like the diameter reduction of FIG. 10, increases the speed of the water downstream of the unit in the x (axial) direction, the y (radial) direction and z (circumferential) direction, to increase the separation effect. The angle θ2 of the conical conduit wall from the axis of the passage is about 10° or preferably about 5° to 20°.

FIGS. 14 and 15 show a separator of the invention which has a conical conduit 415 like that of FIG. 13, but uses a flattened or semi-toroidal volute discharge chamber 412 with a tangential solids discharge 414 of water S. The light fluid laden water outlet 420 for water O has a flared inlet 423 and the clean water outlet 472 for water C has a cylindrical inlet and body.

FIGS. 16 and 17 are views of other embodiments of the separator having a conical impingement orifices 673 and 773 for the clean water outlets 672 and 772. An axial solid water outlet 620 is illustrated in FIG. 16 and a radially extending solid water outlet 720 is illustrated in FIG. 17. FIG. 17 also illustrates the use of a shroud 763 around the rotor blades of the rotor 764 in this embodiment of the invention. It is understood that a rotor, with or without a shroud can be used for any embodiment of the invention depending performance for separating various contaminants.

Figure 18:
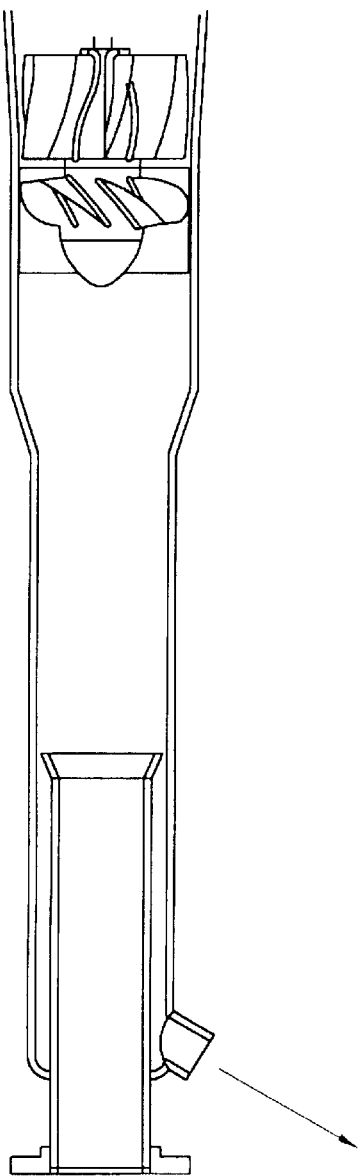
FIG. 18 is a longitudinal sectional view of another embodiment of the separator having a conical separator passage or conduit.

FIGS. 18 and 19 show respective stepped and conical separator passaged used in conjunction with a flared clean water discharge inlet. Length L1 is selected to insure a fully developed swirl before the water reached the clean water inlet and L2 is selected to prevent turbulence in the swirling liquid entering and passing the inlet due to the termination of the passage at D.

Figure 20:
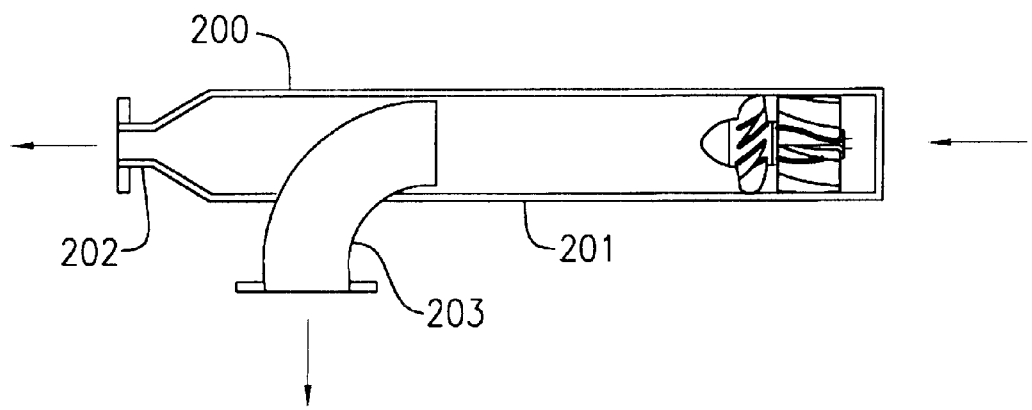
FIG. 20 is a longitudinal sectional view of an embodiment of the separator having solid discharge through an annular diffuser similar to the embodiment of FIG. 3 but without a conical inlet to the solids discharge.

FIG. 20 is a view of an embodiment similar to FIG. 3, where the outlet 200 for dirty water continues cylindrically from the main separator pipe 201 but experiences and conical reduction in diameter at 202. This causes a back pressure in the water in the passage 201 which can be useful for certain application, upstream of the clean water outlet 203. The solid discharge 200 is through an annular diffuser without a conical inlet to the solids discharge.

Figure 21:
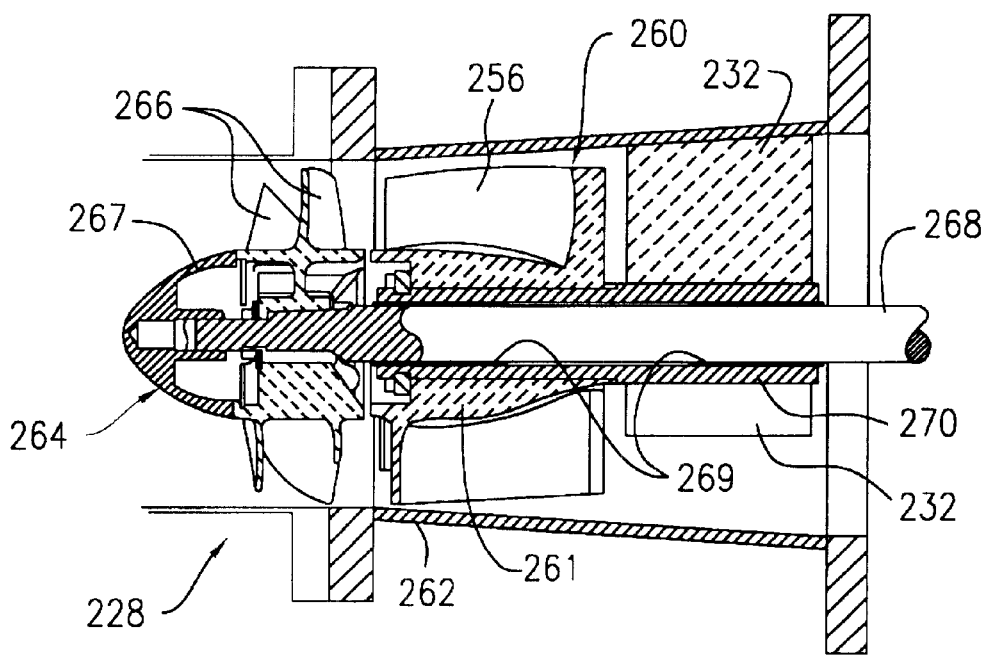
FIG. 21 is a longitudinal sectional and enlarged view of a separator of the present invention in the area of the swirl means of the device.

FIG. 21 is a longitudinal sectional and enlarged view of a separator of the present invention in the area of the swirl means 228 of the device.

The stator 260 has a fixed streamlined hub 261 and a plurality of circumferentially spaced helical blades 265 fixed around the hub and extending along the longitudinal axis of the fluid passage to initiate swirling flow as the water passes the blades. The rotor 264 also comprises a streamlined hub 267 which is mounted for rotation in the passage 262 on a shaft 268 mounted on bearings 269 in the stator hub 261 and in an fixed sleeve 270.

A plurality of circumferentially spaced helical rotor blades 266 are connected around the rotor hub 267 and extend along the longitudinal axis of the fluid passage to continue and enhance the swirling flow as the water passes the rotor. The rotor may use open-ended blades or blades with an outer cylindrical shroud which helps order the flow and reduce turbulence.

Sleeve 270 is fixed in the passage 262 by three circumferentially spaced and equidistant spokes of support 232 welded or otherwise fixed between the sleeve and the passage wall.

Preferred UV Irradiation System

The UV second stage treatment incorporates UV lamps yielding an appropriate dose so as to "kill" and/or alter the DNA of the marine organisms sufficient to meet or exceed the national and international standards pertaining to effective ballast water treatment (here referred to as "disabling" the marine organisms).

Preferred Biocidal Chemical and Dosing

The biocide incorporated in the inventive system is SEAKLEEN® biocide (patent pending) which has been specifically formulated for ballast water use having toxic properties similar to quinones and having a combination of toxicity and cost to rival chlorine. The effectiveness of SEAKLEEN® biocide in low doses and its rapid half-life makes this particular biocide the product of choice for this system. SEAKLEEN® is a trademark for a proprietary biocide available from Garnett Inc. Other possible biocidal chemicals for use with the invention are quinones, juglone and chlorine.

Advantages of the Invention

The apparatus or system of the invention is completely scalable and can, as a result, produce ballast water flow rates equal to the loading rates required by all commercial and military vessels.

The system also provides an economic benefit to ship owners/operators due to its removal of silt and sediment from the ballast water intake stream, obviating the need for periodic and expensive tank clean-out and insuring, all the while, the maximum cargo carriage capacity of the vessel.

The inventive system's "secondary" treatment stage, UV or biocides subject to throughput capacity requirement, is extremely effective and safe for both the crew and the environment. Residence time associated with effective "secondary" treatment is significantly reduced due to the system's removal of entrained solids and does not, as a result, hinder the ballasting process.

The compact size and energy efficiency of the, complete two-stage system allows for easy, cost effective installation and operation aboard both existing vessels and new building tonnage.

Clear environmental benefits accrue from a ship's ability to utilize the invention at the time of every ballast loading, with no subsequent impact or slowdown on other vessel activities or operations.

The apparatus and method of the invention has no crew, vessel, or cargo related safety (stability and trim, longitudinal hull strength, etc.) issues, as are associated with the current ballast water exchange methods.

The system is virtually automatic, requiring minimal crew training and operating instructions. Owing to its design simplicity and quality of construction, the system is virtually clog-free and requires limited maintenance.

While specific embodiments of the invention have been shown and described in detail to illustrate the application of the principles of the invention, it will be understood that the invention may be embodied otherwise without departing from such principles.

What is claimed is:

1. An apparatus for treating water to be supplied to a ballast tank and for reducing silt and sediment build-up in the ballast tank, comprising:

means defining a water pathway having a main inlet for connection to a body of navigable open raw water containing sediment and marine organisms, and a main outlet for connection to a vessel's ballast tank(s);

separator means in the pathway and having a separator means inlet for receiving the raw water, the separator means separating sediment with some water from the raw water to produce initially processed water which contains at least some marine organisms, the separator means having a first outlet for supplying the initially processed water to the pathway, and a second outlet for returning the sediment with some water to the body of raw water;

biocide means connected to the first outlet and in the pathway downstream of the separator means from the main inlet, for receiving the initially processed water and for disabling the marine organisms in the initially processed water to produce treated ballast water; and ballast pump means connected to the pathway, in line with the biocide means for pumping water along the pathway between the main inlet and the main outlet, and through the separator means and the biocide means.

2. An apparatus according to claim 1, wherein the separator means is a centrifugal separator means and comprises: fluid passage means connected between the separator means inlet for receiving the raw water and the first and second outlets, the separator means having a longitudinal axis; a discharge conduit connected to the first outlet; stator means positioned in the fluid passage means for imparting an initial swirling axial movement to the raw water in the fluid passage means passing the stator means; and rotor means positioned in the fluid passage means downstream of the stator means for imparting a further swirling axial movement to the raw water in the fluid passage means downstream of the rotor means and in the discharge conduit and causing the sediment to migrate outwardly.

3. An apparatus according to claim 2, wherein the first outlet exits the passage means radially.

4. An apparatus according to claim 2, wherein the second outlet exits the passage means radially.

5. An apparatus according to claim 2, wherein the second outlet includes a semi-volute chamber and a tangential discharge in the passage means.

6. An apparatus according to claim 2, wherein the first and the second outlets extend conically outwardly downstream of the swirl means.

7. An apparatus according to claim 2, including a third outlet for water with a high concentration of light fluid near the center of the first outlet for discharging water with a high concentration of light fluid through the third outlet.

8. An apparatus according to claim 2, wherein the stator means comprises a stator hub and a plurality of circumferentially spaced fixed helical blades connected to the stator hub, the rotor means comprising an rotor hub and a plurality of circumferentially spaced rotating helical blades connected to the rotor hub.

9. An apparatus according to claim 8, including a shroud around the helical blades of the rotor.

10. An apparatus according to claim 8, wherein the stator and the rotor hubs are streamlined and smoothly transition into each other.

11. An apparatus according to claim 8, including a rotor shaft connected to the rotor and mounted for rotation to the passage means, and bearing means between the stator hub and the rotor shaft for rational support of the rotor shaft.

12. An apparatus according to claim 8, wherein the first outlet for supplying the initially processed water includes an outlet conduit in the passage means, the passage means comprising a separator conduit, the outlet conduit having an inlet end which is separated from the separator conduit by a gap forming an inlet end for the second outlet for returning the sediment with some water.

13. An apparatus according to claim 12, wherein the inlet end of the first outlet is cylindrical.

14. An apparatus according to claim 12, wherein the gap is about 0.125 inches to about 2.5 inches wide.

15. An apparatus according to claim 12, wherein a length of the outlet conduit is about 6 inches to about 48 inches, and a length from the swirl means to the inlet end of the first outlet is about 10 inches to about 120 inches for reducing turbulence near the inlet end and for permitting the swirl means to create a fully developed swirl upstream of the inlet end.

16. An apparatus according to claim 12, wherein the inlet end of the first outlet is flared outwardly toward the separator conduit.

17. An apparatus according to claim 16, wherein the inlet end of the first outlet is flared at an angle of about 10° to about 45°.

18. An apparatus according to claim 12, wherein the separator conduit has a reduction in diameter in at least one area from the swirl means to the inlet end of the first outlet for increasing the speed of liquid flow in the separator conduit.

19. An apparatus according to claim 18, wherein the reduction in diameter comprises a step down in diameter.

20. An apparatus according to claim 19, where in the separator conduit diameter upstream of the step down is about 1 inch to about 36 inches and the separator conduit diameter downstream of the step down is about 0.75 inches to about 32 inches.

21. An apparatus according to claim 18, wherein reduction in diameter comprises the separator conduit being conically reduced in diameter downstream of the swirl means.

22. An apparatus according to claim 21, wherein the separator conduit is conically reduced at an angle from the axis of the separator conduit of about 5 to 20 degrees.

23. An apparatus according to claim 1, wherein the biocide means comprises UV irradiation means for killing the marine organisms and/or for altering the DNA of the marine organisms, by irradiation.

24. An apparatus according to claim 1, wherein the biocide means comprises chemical means for killing the marine organisms and/or for altering the DNA of the marine organisms, using a chemical biocidal agent.

25. A method for treating water to be supplied to a vessel's ballast tank, comprising:

establishing a water pathway having a main inlet for connection to a body of navigable open raw water containing sediment and marine organisms, and a main outlet for connection to the vessel's ballast tank;

separating the raw water for separating sediment with some water from the raw water to produce initially processed water which contains at least some marine organisms, the separating step taking place in the pathway;

subjecting the initially processed water to a biocidal action downstream of the separating step in the pathway for disabling the marine organisms in the initially processed water to produce treated ballast water; and pumping water along the pathway and from the main inlet to the main outlet using ballast rump means that are in line with the biocidal action step in the pathway.

26. A method according to claim 25, wherein the biocidal step comprises UV irradiation of the marine organisms for killing the marine organisms and/or altering the DNA of the marine organisms.

27. A method according to claim 25, wherein the biocidal step comprises exposing the organisms to a chemical biocidal agent for killing the marine organisms and/or altering the DNA of the marine organisms.

* * * * *